(12) United States Patent
Zhu et al.

(10) Patent No.: US 11,961,298 B2
(45) Date of Patent: Apr. 16, 2024

(54) MEMORY-GUIDED VIDEO OBJECT DETECTION

(71) Applicant: Google LLC, Mountain View, CA (US)

(72) Inventors: Menglong Zhu, Playa Vista, CA (US); Mason Liu, Acton, MA (US); Marie Charisse White, Mountain View, CA (US); Dmitry Kalenichenko, Los Angeles, CA (US); Yinxiao Li, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 154 days.

(21) Appl. No.: 17/432,221

(22) PCT Filed: Feb. 22, 2019

(86) PCT No.: PCT/US2019/019102
§ 371 (c)(1),
(2) Date: Aug. 19, 2021

(87) PCT Pub. No.: WO2020/171818
PCT Pub. Date: Aug. 27, 2020

(65) Prior Publication Data
US 2022/0189170 A1 Jun. 16, 2022

(51) Int. Cl.
*G06V 10/00* (2022.01)
*G06V 10/70* (2022.01)
(Continued)

(52) U.S. Cl.
CPC .......... *G06V 20/40* (2022.01); *G06V 10/774* (2022.01); *G06V 10/776* (2022.01);
(Continued)

(58) Field of Classification Search
CPC .......... G06N 3/08; G06N 3/0454; G06N 3/82; G06N 3/54; G06V 10/806; G06V 10/82;
(Continued)

(56) References Cited

U.S. PATENT DOCUMENTS 8,098,891 B2 * 1/2012 Lv ........................... G06T 7/285
382/285
10,452,946 B2 10/2019 Hotson et al.
(Continued)

FOREIGN PATENT DOCUMENTS

CN 108985165 12/2018
JP 2005196750 7/2005

OTHER PUBLICATIONS

International Preliminary Report on Patentability for Application No. PCT/US2019/019102, dated Sep. 2, 2021, 10 pages.
(Continued)

*Primary Examiner* — Amir Alavi
(74) *Attorney, Agent, or Firm* — DORITY & MANNING P.A.

(57) ABSTRACT

Systems and methods for detecting objects in a video are provided. A method can include inputting a video comprising a plurality of frames into an interleaved object detection model comprising a plurality of feature extractor networks and a shared memory layer. For each of one or more frames, the operations can include selecting one of the plurality of feature extractor networks to analyze the one or more frames, analyzing the one or more frames by the selected feature extractor network to determine one or more features of the one or more frames, determining an updated set of features based at least in part on the one or more features and one or more previously extracted features extracted from a previous frame stored in the shared memory layer, and
(Continued)

detecting an object in the one or more frames based at least in part on the updated set of features.

21 Claims, 11 Drawing Sheets

(51) Int. Cl.
    *G06V 10/774*     (2022.01)
    *G06V 10/776*     (2022.01)
    *G06V 10/80*     (2022.01)
    *G06V 10/82*     (2022.01)
    *G06V 10/94*     (2022.01)
    *G06V 20/40*     (2022.01)

(52) U.S. Cl.
    CPC ............ *G06V 10/806* (2022.01); *G06V 10/82* (2022.01); *G06V 10/87* (2022.01); *G06V 10/955* (2022.01); *G06V 20/46* (2022.01)

(58) Field of Classification Search
    CPC .... G06V 10/87; G06V 10/955; G06V 10/774; G06V 10/776; G06V 10/40; G06V 10/44; G06V 20/40; G06V 20/46; G06F 18/285; G06T 2207/10016; G06K 9/62; G06K 9/6227
    See application file for complete search history.

(56) References Cited

U.S. PATENT DOCUMENTS

| | | | | |
|---|---|---|---|---|
| 10,452,959 | B1 * | 10/2019 | Gautam | G06N 3/02 |
| 10,997,421 | B2 * | 5/2021 | Khosla | G06V 20/52 |
| 11,138,409 | B1 * | 10/2021 | Krueger | G06V 10/82 |
| 11,288,515 | B2 * | 3/2022 | Aliamiri | G06V 20/47 |
| 11,308,325 | B2 * | 4/2022 | McClernon | G09B 23/28 |
| 11,361,505 | B2 * | 6/2022 | Grabner | G06F 18/22 |
| 11,423,644 | B1 * | 8/2022 | Liang | G06V 10/94 |
| 11,527,072 | B2 * | 12/2022 | Szoke-Sieswerda | G06V 10/764 |
| 11,651,588 | B1 * | 5/2023 | Yeh | G06V 10/7715 382/181 |
| 11,804,112 | B2 | 10/2023 | Voss | |
| 2010/0220922 | A1 * | 9/2010 | Okada | G06V 40/107 382/159 |
| 2014/0286568 | A1 * | 9/2014 | Saruta | G06V 10/757 382/159 |
| 2018/0211403 | A1 | 7/2018 | Hotson et al. | |

OTHER PUBLICATIONS

Liu et al., "Looking Fast and Slow: Memory-Guided Mobile Video Object Detection", Mar. 25, 2019, arxiv.org, arxiv.org/abs/1903.10172v1, 10 pages.

International Search Report for Application No. PCT/US2019/019102, dated Nov. 19, 2019, 2 pages.

Sam et al., "Switching Convolutional Neural Network for Crowd Counting", Proceedings of IEEE Computer Society Conference on Computer Vision and Pattern Recognition, Jul. 1, 2017, Jul. 1, 2017, pp. 4031-4039.

Chinese Search Report Corresponding to Application No. 2019800942352 on Jan. 22, 2024.

* cited by examiner

MEMORY-GUIDED VIDEO OBJECT DETECTION

PRIORITY CLAIM

This application is based upon and claims the right of priority under 35 U.S.C. § 371 to International Application No. PCT/US2019/019102 filed on Feb. 22, 2019. Applicant claims priority to and the benefit of this application and incorporates herein by reference in its entirety.

FIELD

The present disclosure relates generally to memory-guided video object detection. More particularly, the present disclosure relates to systems and methods which use an interleaved object detection model which can employ a plurality of feature extractor networks and a shared memory layer to analyze frames of a video to detect and track objects.

BACKGROUND

Recent advances in image object detection have followed a trend of increasingly elaborate convolutional neural network designs to improve either accuracy or speed. Though accuracy was initially the primary concern and continues to be a key metric, the importance of improving the speed of these models has steadily risen as deep learning techniques have been increasingly deployed in practical applications. On the far end of the speed spectrum, substantial work has been done on allowing neural networks to run on mobile devices, which represent an environment with extreme computation and energy constraints. However, despite significant advances, the ultimate goal of being able to run neural networks in real-time on mobile devices without substantial accuracy loss has yet to be achieved by any single-frame detection model.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for detecting objects in a video. The computer-implemented method can include inputting a video into an interleaved object detection model comprising a first feature extractor network, a second feature extractor network, and a shared memory layer. The video can include a plurality of frames. The method can further include analyzing an initial frame of the video with the first feature extractor network to determine an initialized set of features. The method can further include storing the initialized set of features in the shared memory layer. For each of one or more subsequent frames of the video, the method can further include selecting the first feature extractor network or the second feature extractor network to analyze the subsequent frame, analyzing the subsequent frame by the selected feature extractor network to determine one or more subsequent features of the subsequent frame, determining an updated set of features based at least in part on the one or more subsequent features, and detecting an object in the subsequent frame based at least in part on the updated set of features.

Another example aspect of the present disclosure is directed to a computing system, comprising one or more processors and one or more non-transitory computer-readable media that collectively store instructions that, when executed by the one or more processors, cause the computing system to perform operations. The operations can include inputting a video into an interleaved object detection model comprising a plurality of feature extractor networks and a shared memory layer. The video can include a plurality of frames. For each of one or more frames, the operations can include selecting one of the plurality of feature extractor networks to analyze the one or more frames. The operations can further include analyzing the one or more frames by the selected feature extractor network to determine one or more features of the one or more frames. The operations can further include determining an updated set of features based at least in part on the one or more features and one or more previously extracted features extracted from a previous frame stored in the shared memory layer. The operations can further include detecting an object in the one or more frames based at least in part on the updated set of features.

Another example aspect of the present disclosure is directed to a computer-implemented method of training an interleaved object detection model comprising a first feature extractor network, a second feature extractor network, and a shared memory layer. The method can include inputting a training video comprising a plurality of image frames into the interleaved object detection model. For one or more frames of the video, the method can further include randomly selecting either the first feature extractor network or the second feature extractor network. The method can further include analyzing the one or more image frames of the training video with the selected feature extractor network to determine one or more detected objects present in the plurality of image frames. The method can further include determining a detection loss function based at least in part on a comparison of a ground-truth detection and the one or more detected objects. The method can further include training the interleaved object detection model based at least in part on the detection loss function.

Another example aspect of the present disclosure is directed to a computer-implemented method of training an adaptive interleaved policy network for an object detection model. The object detection model can include the adaptive interleaved policy network, a first feature extractor network configured for accuracy, a second feature extractor network configured for speed, and a shared memory layer. The method can include inputting training data into the object detection model to generate one or more batches of inference data, each batch of inference data comprising state data, action data, and reward function data. The method can further include training the adaptive interleaved policy network based at least in part on the one or more batches of inference data.

Other aspects of the present disclosure are directed to various systems, methods, apparatuses, non-transitory computer-readable media, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended FIGURES, in which.

Figure 1:
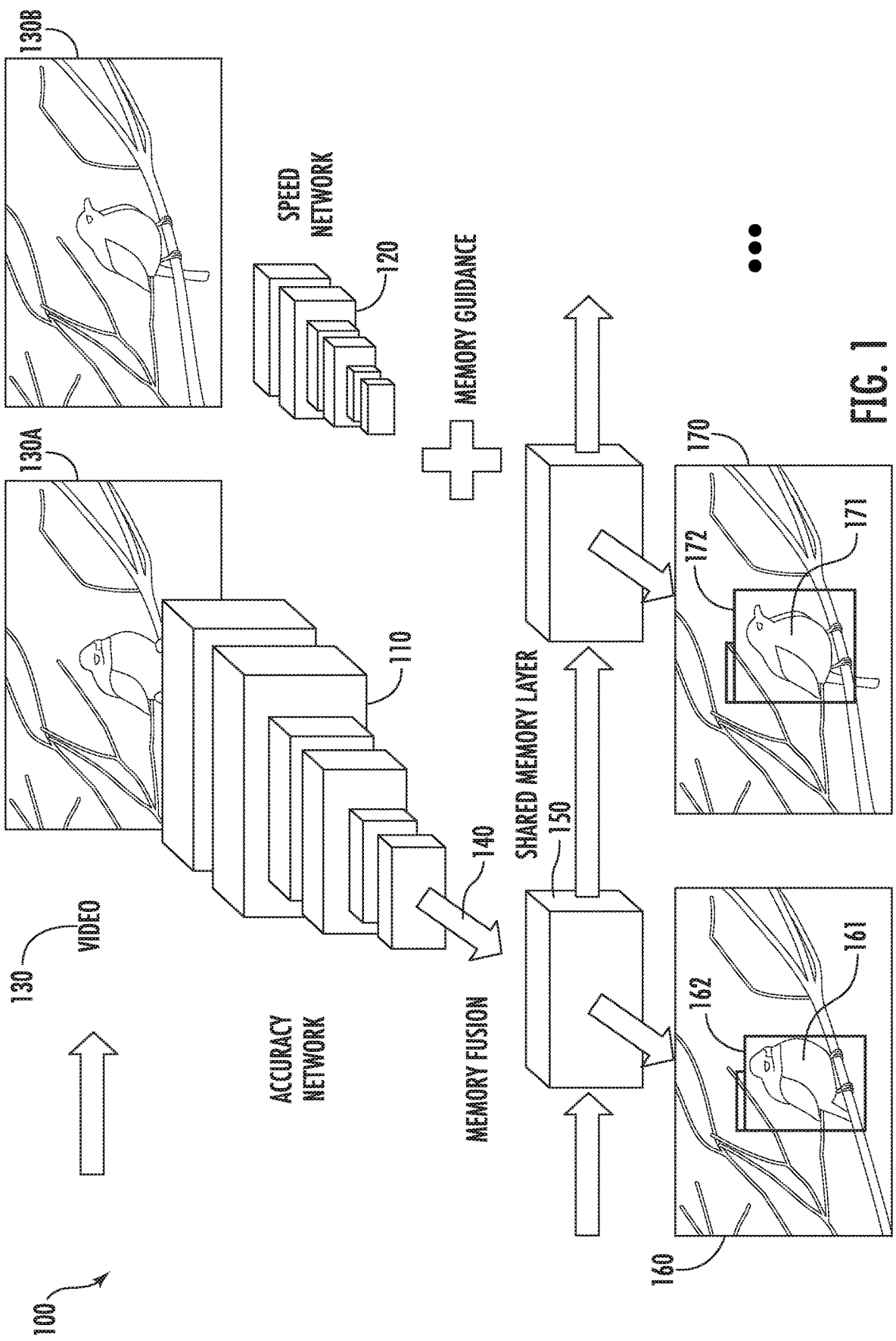
FIG. 1 depicts an example interleaved object detection model according to example aspects of the present disclosure.

Reference numerals that are repeated across plural FIGURES are intended to identify the same features in various implementations.

DETAILED DESCRIPTION

Overview

Generally, the present disclosure is directed to an interleaved object detection model which can employ a plurality of feature extractor networks and a shared memory layer to analyze frames of a video to detect and track objects. In particular, an interleaved object detection model can include a first feature extractor network (e.g., a first convolutional neural network) and a second feature extractor network (e.g., a second convolutional neural network), which can have different properties which reflect different tradeoffs between accuracy and computational latency For example, the first feature extractor network can be a conventional feature extractor network, and the second feature extractor network can be a lightweight feature extractor network with a significantly shorter run time. The interleaved object detection model can select either the first feature extractor network or the second feature extractor network to analyze frames in a video. For example, in some implementations, the first feature extractor network can extract features from a first frame of a video and store the first extracted features in a shared memory layer (e.g., a LSTM layer). The second feature extractor network can run on one or more subsequent frames to extract subsequent features, and the subsequent features can be fused with the first extracted features to update the features for the subsequent frames. The object detection model can then detect objects based on the fused features. The first feature extractor network can then be periodically run on subsequent frames to determine updated features, and the updated features can be stored in the shared memory layer. Further, the interleaved object detection model can implement various interleaving policies, such as an adaptive interleaving policy or a fixed interleaving policy, to select which feature extractor network to respectively use to analyze each respective frame of the video. The feature extractor networks can further be configured to operate in a synchronous mode in which a single extractor network is run at a time for each frame (e.g., sequentially), or in an asynchronous mode in which the feature extractor networks are run in parallel threads (e.g., concurrently).

Because adjacent video frames tend to be similar, running a single feature extractor on multiple frames is likely to result in mostly redundant computation. The present disclosure is directed towards systems and methods to allow neural networks to perform video object detection with very little computation when assisted by memory. For example, an interleaved object detection model according to example aspects of the present disclosure can include multiple feature extractor networks and a shared memory layer. A first feature extractor network can be configured for accuracy and a second feature extractor network can be configured for speed. The accurate feature extractor network can initialize and maintain the memory, while the speed feature extractor network can be used to rapidly extract a small amount of necessary features from new frames.

In some ways, the example object detection models of the present disclosure are similar to the human visual system. For example, human vision does not operate on single images, but rather a stream of images. Even with a single eye fixation lasting just a fraction of a second, the human visual system is capable of forming a rich representation of a complex environment by relying on contextual cues and memory to supplement the visual system's understanding of the image. This phenomenon is known as recognizing the "gist" of the scene and is accomplished by relying on relevant prior knowledge. Thus, in some ways, the example object detection models of the present disclosure parallel the role of gist in the human visual system in that both require minimal computation and rely on memory to be effective.

More particularly, the present disclosure provides a novel interleaved framework where two (or more) feature extractor networks with different speeds and recognition capacities can be run on different image frames. For example, the feature extractor networks can have different computational latencies, input resolutions, and object detection and recognition capabilities. As an example, a first feature extractor network can be configured for accuracy (such as, for example, having increased object detection capabilities and/or a higher input resolution), and a second feature extractor network can be configured for speed (such as, for example, having reduced object detection capabilities and/or a lower input resolution). The features from these extractors can be used to maintain a common visual memory of the scene in an image. For example, the common visual memory can be a maintained in the form of an LSTM layer. For frames which are analyzed by the feature extractor network configured for accuracy, features extracted from the frame can be used to detect objects, and the extracted features can be stored in the shared memory layer. For frames which are analyzed by the feature extractor network configured for speed, features extracted from an image can be fused with features from previous frames (e.g., the most recently stored features in the shared memory layer from a frame which was analyzed by feature extractor network configured for accuracy). Further, detections can then be generated from the fused features.

In some implementations, an adaptive interleaving policy can be implemented in an interleaved object detection model (e.g., by a lightweight adaptive interleaved policy network) which can select one of the feature extractor networks to analyze an individual frame. For example, in some implementations, an interleaved object detection model can be trained to decide when a particular feature extractor network should be used to analyze a frame using the combination of previously stored features (e.g., the memory) and subsequently extracted features (e.g., the gist). For example, an adaptive interleaving policy can be learned by formulating the task as a reinforcement learning problem. In some implementations, a reward function comprising a speed reward component and an accuracy component can be used to train the adaptive interleaving policy. For example, the speed reward can be a fixed value which is awarded when the lightweight, shorter computational latency feature extractor network analyzes a frame. Further, the accuracy reward can be based on a detection loss determined based at least in part on the loss difference between the minimum-loss feature extractor (e.g., the feature extractor configured for accuracy) and the selected feature extractor network.

In some implementations, a fixed interleaving policy can be implemented to select a feature extractor to analyze an individual frame. For example, a tunable interleaving ratio hyperparameter $\tau$ can be used to select a feature extractor network to analyze an individual frame such that one feature extractor network is run after $\tau$ frames have been analyzed by the other feature extractor network. As an example, the feature network configured for accuracy can be run after $\tau$ frames have been analyzed by the feature extractor network configured for speed, and the extracted features can be stored in the shared memory layer. The feature extractor network configured for speed can be run for the other frames, and detections can be generated by fusing the extracted features with the previously stored features.

In some implementations, the interleaved object detection model can be configured to operate in a synchronous mode. For example, a single feature extractor network can be run at each time step (e.g., each frame) in a sequential manner. For example, for a frame $I_k$, the first feature extractor network can analyze the frame, and for a subsequent frame $I_{k+1}$, the second feature extractor network can analyze the frame once the first feature extractor network has analyzed frame $I_k$.

In some implementations, the interleaved object detection model can be configured to operate in an asynchronous mode. For example, the two (or more) feature extractor networks can be configured to run in parallel threads. For example, the first feature extractor network can analyze a frame $I_k$, while the second feature extractor network analyzes frame $I_{k+1}$. Further, since the first feature extractor network may require a lengthier run time than the second feature extractor network, the second feature extractor network can concurrently analyze frame $I_{k+1}$ while the first feature extractor network analyzes frame $I_k$. Stated differently, the analysis of the first frame $I_k$ and the second frame $I_{k+1}$ can overlap. As the run-time of the second feature extractor network can be shorter than the first feature extractor network, the second feature extractor network can further analyze one or more additional frames (e.g. frames $I_{k+2}$, $I_{k+3}$, . . . ) while the first feature extractor network continues to analyze frame $I_k$. Moreover, in some implementations, the first feature extractor network can update the shared memory layer at the completion of analysis of a frame, and the extracted features for the subsequent frame can be fused with the most recently stored features in the shared memory layer to generate detections.

While other object detection methods, notably flow-based methods, also provide approaches for fast video object detection based on interleaving fast and slow networks, these approaches are based on the CNN-specific observation that intermediate features can be warped by optical flow. The present disclosure, however, can utilize a visual memory to track objects, and is therefore not dependent on optical flow. The example methods and systems of the present disclosure have demonstrated unprecedented online (e.g., real-time) performance, achieving a 72.3 FPS post-optimization on a mobile computing device, while matching state-of-the-art performance on the Imagenet VID 2015 benchmark.

The systems and method of the present disclosure provide a number of technical effects and benefits. For example, by providing a shared memory layer, the present disclosure allows for the determination of a set of features based on one or more previously detected features. In this way, an improved object detection is provided based on an ongoing updated set of features in the stored memory layer. Analysis to determine a subsequent set of features, following the determination of an initial set of features, can be performed more quickly, with a reduced processing cost, because at least some of the determined features can be established in the stored memory layer. Thus an ongoing object detection process for an input video can be made more efficient, with a reduced processing cost and/or an improved processing frame rate.

As another example technical effect and benefit, the systems and method of the present disclosure can allow for subsequent frames to be analyzed by either of a first feature extractor network and a second feature extractor network. In this way, the method allows two or more networks to be used in combination, in a complementary manner. In some implementations, the selection of a particular feature extractor network can be based on currently available computer resources. For example, processor availability, battery resources, memory resources, the number of concurrently running applications, and other computer resource parameters can be taken into consideration when choosing a feature extractor network to be used to analyze particular frames, thereby optimizing accuracy within the currently observed computational constraints. In this way, the present disclosure allows, for example, a more efficient network to be employed for the subsequent frames such that an overall processing cost is reduced, while an overall detection performance is maintained due to the shared memory layer. In some implementations, different feature extractor networks can be provided to operate at different scales, so that the method can provide an improved detection performance at different scales.

As another example technical effect and benefit, the systems and method of the present disclosure can implement an adaptive interleaved policy for selection of either feature extractor network. In this way, the present disclosure can provide further improvements in speed, efficiency and/or detection performance, according to a training reward function provided for the adaptive interleaved policy. Example aspects of the present disclosure can provide a reward function to balance two or more reward goals, so as to provide a balance of, for example, improved processing efficiency and object detection accuracy. For example, the reward function parameters can be manually tuned to generate different interleaved object detection models optimized for a particular balance between speed and accuracy for particular applications. For every subsequent frame, the adaptive interleaved policy can be used to select either of the first feature extractor network or the second feature extractor, such that the present disclosure provides an improved object detection process independently of the content of the input video. In this way, the selection of the first feature extractor network or the second feature extractor can be determined to provide the most efficient and/or most accurate object detection for the input video.

As another example technical effect and benefit, the systems and method of the present disclosure can allow for processing by the first feature extractor network and the second feature extractor to be carried out asynchronously. In this way, the present disclosure provides a more constant, predictable processing load. By improving the consistency of processor demand in this way, the systems and methods of the present disclosure allow for more efficient object detection, while maintaining object detection accuracy.

With reference now to the FIGURES, example aspects of the present disclosure will be discussed in further detail.

Example Interleaved Object Detection Models

FIG. 1 depicts an example interleaved object detection model 100 according to example aspects of the present disclosure. An interleaved object detection model 100 can include a plurality of feature extractor networks. For example, as shown, a first feature extractor network 110 and a second feature extractor network 120 can be included in the interleaved object detection model 100. In some implementations, the first feature extractor network 110 can be configured for accuracy, while a second feature extractor network 120 can be configured for speed. The feature extractor networks 110/120 can be, for example, convolutional neural networks and can include one or more convolutional layers. In some implementations, the first feature extractor network 110 and the second feature extractor network 120 can have different computational latencies. For example, in some implementations, the second feature extractor network 120 can have a shorter run time as compared to the first feature extractor network 110. In some implementations, the first feature extractor network 110 can have a reduced detection loss as compared to the second feature extractor network 120.

According to example aspects of the present disclosure, a video 130 comprising a plurality of image frames 130A-B (e.g., a stream of image frames) can be input into the interleaved object detection model 100. For example, an initial frame 130A of the video 130 can be analyzed by the first feature extractor network 110 to extract one or more features 140 from the frame 130A. The one or more features 140 can then be stored in a shared memory layer 150. In some implementations, the shared memory layer 150 can be, for example, a long short-term memory network. The one or more features 140 extracted from the initial frame 130A can then be used to detect an object. For example, the one or more features 140 can be input into a detection layer (not shown), and a detected object output 160 can be received from the detection layer. For example, in some implementations, an object 161 can be detected and the output can be a bounding box 162 around the object 161.

According to additional example aspects of the present disclosure, a subsequent frame 130B can be analyzed by the second feature extractor network 120 to extract one or more subsequent features in the subsequent frame 130B. Further, the one or more subsequent features can be fused with one or more features which had recently been stored in the shared memory layer 150. For example, the most recently stored features from a frame analyzed by the first feature extractor network 110 can be fused with the one or more subsequent features extracted by the second feature extractor network 120 to determine an updated set of features. The updated set of features can then be input into a detection layer (not shown), and a detected object output 170 can be received from the detection layer. For example, in some implementations, an object 171 (e.g., the object 161 from a previous frame) can be detected and the output can be a bounding box 172 around the object 171. In this way, as will be described in greater detail herein, the interleaved object detection model 100 can use a plurality of feature extractor networks 110/120 to extract features from a video 130 by analyzing individual frames 130A/B with a selected feature extractor network 110/120. Further, extracted features can be stored in a shared memory layer 150, and objects 161/171 can be detected by the interleaved object detection model 100.

The present disclosure thus addresses the task of video object detection. For this task, the example object detection models of the present disclosure can generate frame-level bounding boxes and class predictions on each frame of a video $V=\{I_0, I_1, \ldots I_n\}$. The example models of the present disclosure can further be used in an online setting where only $\{I_0, I_1, \ldots I_k\}$ are available when generating detections for the k-th frame.

Further, the present disclosure provides an interleaved model framework where multiple feature extractors can be run sequentially or concurrently. The frame-level features extracted by feature extractor network can be aggregated and refined using a memory mechanism, as provided herein. Moreover, objects can be detected by the interleaved object detection model, such as by using SSD-style detection on the refined features to produce bounding box results.

The example methods of the present disclosure can be represented as a plurality of functions. For example, let the m feature extractors be $f_k: \mathbb{R}^I \to \mathbb{R}^F|_{k=0}^m$, mapping the image space to separate feature spaces in $\mathbb{R}^F$. A shared memory layer (e.g. a memory module) can be represented as m: $\mathbb{R}^F \times \mathbb{R}^S \to \mathbb{R}^R \times \mathbb{R}^S$, and can map features from f and an internal state representation to a common, refined feature space while also outputting an updated state. A detection layer (e.g., an SSD detector) can be represented as d: $\mathbb{R}^R \to \mathbb{R}^D$, and can map refined features to final detection anchor predictions.

The example object detection models of the present disclosure which utilize multiple feature extractors provide several advantages. For example, different feature extractors can specialize on different image features, which can create a temporal ensembling effect. Further, features extractors can have drastically different computational costs. For example, some feature extractors can be configured for accuracy (e.g., have low detection losses), while other feature extractors can be configured for speed (e.g., have low run times), which can dramatically decrease the runtime of the model. The example interleaved object detection models of the present disclosure can include any number of feature extractor networks. As an example, in some implementations, the number of feature extractor networks can be m=2, with $f_0$ (e.g., a first feature extractor network) configured for accuracy and $f_1$ (e.g., a second feature extractor network) configured for speed.

An interleaved object detection model according to example aspects of the present disclosure can obtain detection results $D_k$ on the k-th frame given the previous frame's state $S_{k-1}$, by running $m(f_i(I_k), S_{k-1})$ to obtain a feature map $F_k$ and the updated state $S_k$. Stated differently, detection results can be obtained by fusing a previous frame's state with features extracted from a current frame. Thus, $D_k = d(F_k)$.

Figure 2:
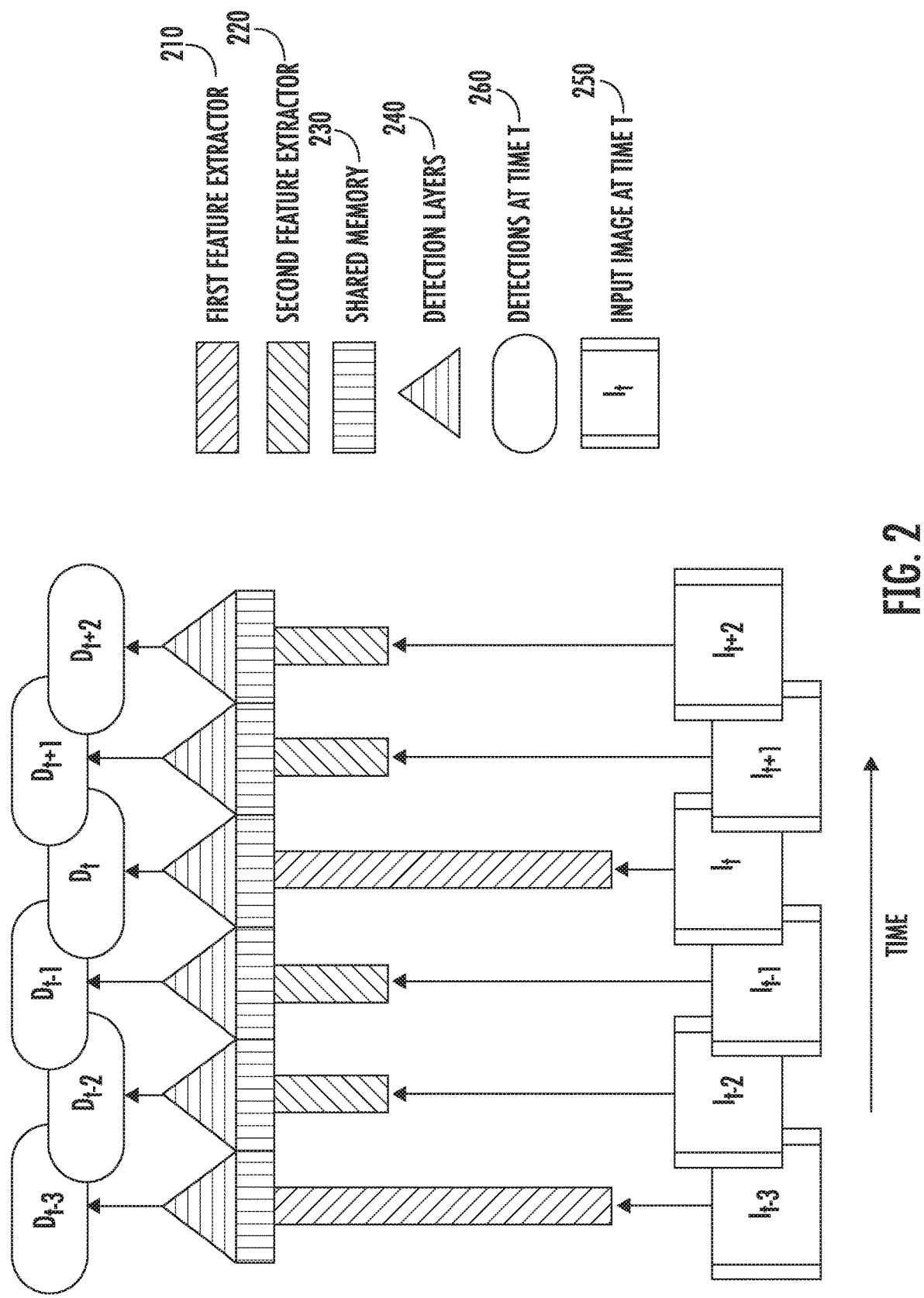
FIG. 2 depicts an example interleaved object detection model using a fixed interleaved policy according to example aspects of the present disclosure.

FIG. 2 shows an example interleaved object detection model using a fixed interleaved policy according to example aspects of the present disclosure. For example, as shown, an interleaved object detection model 200 can include a first feature extractor 210, a second feature extractor 220, a shared memory layer 230, and one or more detection layers 240. For each frame $I_k$ 250, a detection $D_k$ 260 can be obtained.

According to example aspects of the present disclosure, in some implementations, a fixed interleaving policy can be used in which the first feature extractor 210 or the second feature extractor 220 are used to analyze an individual frame $I_k$ using a tunable interleaving ratio hyperparameter τ. For example, the hyperparameter τ can be used to select a feature extractor network 210/220 to analyze an individual frame $I_k$ such that one feature extractor network is run after τ frames have been analyzed by the other feature extractor network. For example, as shown in FIG. 2, τ=2 where the first feature extractor network 210 can analyze a frame $I_{t-3}$, while the second feature extractor network 220 can analyze subsequent frames $I_{t-2}$ and $I_{t-1}$. For frame $I_t$, the first feature extractor network 210 can then be run, and then the second feature extractor network 220 can analyze subsequent frames $I_{t+1}$ and $I_{t+2}$. Note that running any feature extractor (e.g., choosing any valid i) will yield valid detection results, but the quality of the detections and the updated state representation may vary. Thus, it may be desirable to find an interleaving policy such that the amortized runtime of the object detection model 200 is similar to $f_1$ (e.g. the second feature extractor network 220) while retaining the accuracy of exclusively running $f_0$ (e.g., the first feature extractor network 210). Thus, a simple fixed interleaving policy may require defining a hyperparameter τ, the interleave ratio, and running $f_0$ after $f_1$ is run τ times.

In some implementations, $f_0$ (e.g., the first feature extractor network 210) and $f_1$ (e.g., the second feature extractor network 220) can have different computational latencies. For example, the first feature extractor network 210 may have a longer run time than the second feature extractor network 220. Further, the first feature extractor network 210 may have lower detection losses than the second feature extractor network 220. Moreover, the first feature extractor network 210 and the second feature extractor network 220 can have different input resolutions. For example, in some implementations, the architecture of $f_0$ can be a first convolutional neural network (e.g., a standard MobileNetV2 with a depth multiplier of 1.4 and an input resolution of 320×320) and the architecture of $f_1$ can be a second convolutional neural network (e.g., a MobileNetV2 architecture with a depth multiplier of 0.35 and a reduced input resolution of 160×160). In such a configuration, the striding on the last strided convolution may need to be removed for the output dimensions to match. In some implementations, the detection layers 240 can be, for example, SSDLite layers that output SSD feature maps having a constant channel depth of 256 and a convolutional box predictor. In some implementations, the aspect ratios of the anchors can be limited to {1, 0.5, 2.0}.

Example Shared Memory Layers

Figure 3:
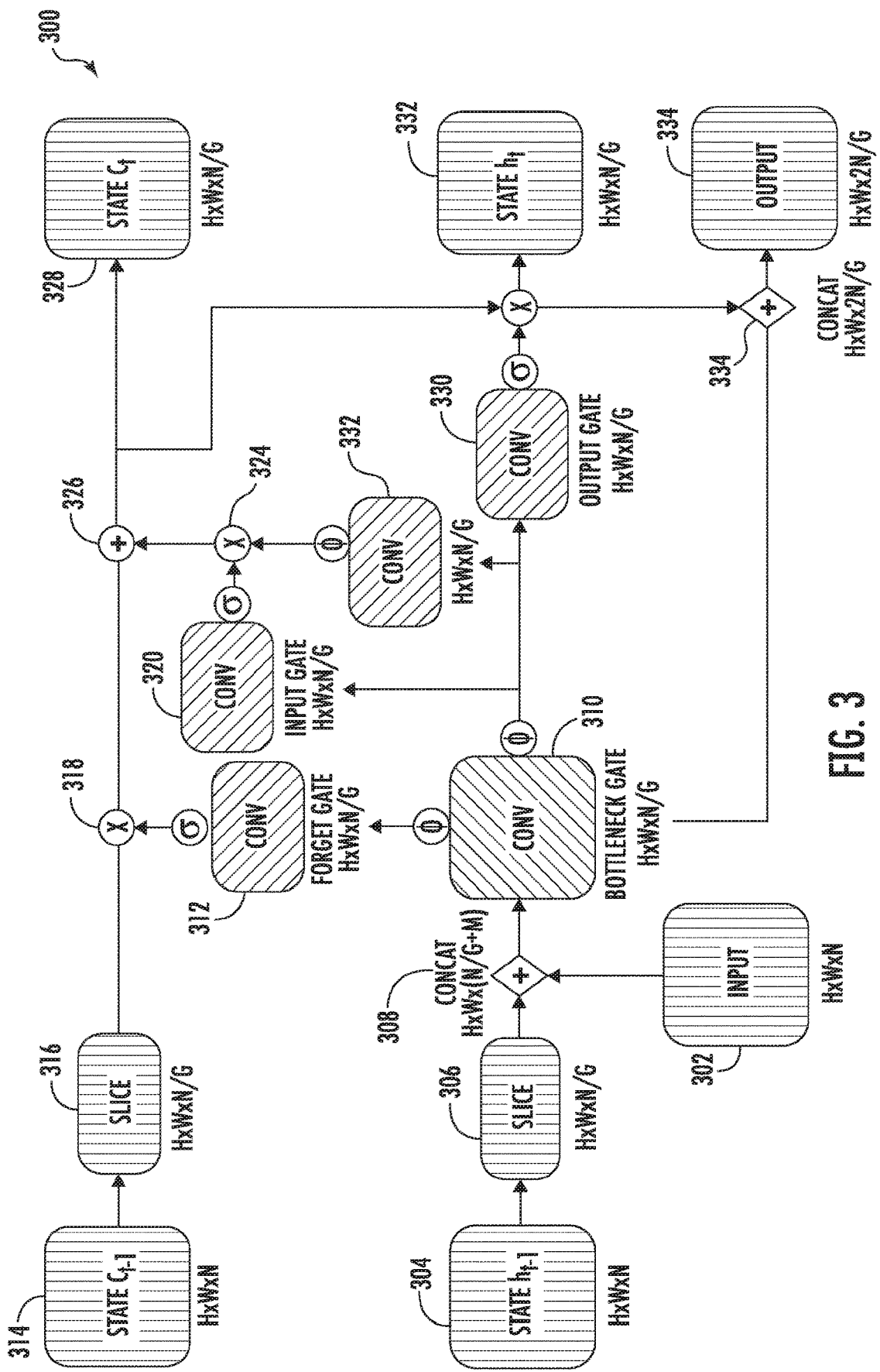
FIG. 3 depicts an example shared memory layer according to example aspects of the present disclosure.

An example shared memory layer (e.g., a memory module) 300 according to example aspects of the present disclosure is depicted in FIG. 3. The shared memory layer 300 can allow for augmenting coarse features using temporal cues, such as when a feature extractor network configured for speed is used. The shared memory layer 300 can aggregate features from different feature extractors. The shared memory layer 300 can receive input features from different feature spaces and project them into a shared feature space. Further, the shared memory layer 300 can be executed on all frames in a very short run time, while preserving long-term dependencies.

The shared memory layer 300 can be configured to receive an input 302 (e.g., a spatial feature map from a feature extractor network) and the state $h_{t-1}$ 304 of the shared memory layer from a previous frame (e.g., a spatio-temporal feature map from a feature extractor network for a previous frame). The state $h_{t-1}$ 304 can be sliced into groups 306 and grouped convolutions can be processed separately. Given the previous state $h_{t-1}$ 304 with N channels and input feature map $x_t$ with M channels, the shared memory layer can partition the state $h_{t-1}$ 304 channel-wise into G partitions $^1h_{t-1}, {}^2h_{t-1} \ldots {}^Gh_{t-1}$. Let $$K = \frac{N}{G},$$

so each partition has K channels. Each group of slices 306 can then be processed by one or more convolutional layers. For example, for each group, the following operations can be performed:

$$b_t = \phi({}^{M+K}W^K_b \hat{a}[x_t, {}^gh_{t-1}])$$

$$f_t = \alpha({}^KW^K_f \hat{a}b_t)$$

$$i_t = \sigma({}^KW^K_i \hat{a}b_t)$$

$$o_t = \alpha({}^KW^K_o \hat{a}b_t)$$

$$^gc_t = f_t \circ c_{t-1} + i_t \circ \phi({}^KW^K_c \hat{a}b_t)$$

$$^gh_t = [o_t \circ \phi(c_t), b_t]$$

where $^gc_t$ and $^gh_t$ are slices of the updated state and output respectively. Finally, the slices can be concatenated channel-wise to obtain $c_t$ and $h_t$. Note that $^jW^k\hat{a}X$ denotes a depthwise separable convolution with weights W, input X, j input channels, and k output channels, φ denotes the ReLU activation function, ∘ denotes the Hadamard product, σ denotes the sigmoid function, and [a, b] denotes channel-wise concatenation of a and b, as shown in FIG. 3. In some implementations, the number of groups G=4 with a 320-channel state.

As depicted at 308, the slices 306 can be concatenated with the input 302, and processed by a bottleneck gate 310. The bottleneck gate 310 may include one or more convolutional layers. As noted in FIG. 3, the state $h_{t-1}$ 304 can have dimensionality H×W×N, the input 302 can have dimensionality H×W×N, each slice can have dimensionality H×W×N/G, and following concatenation at 308, the input to the bottleneck gate 310 can have dimensionality $$H \times W \times \left(\frac{N}{G} + M\right).$$

The output of the bottleneck gate 310 can be input into a forget gate 312. The forget gate 312 may include one or more convolutional layers.

An internal cell state $c_{t-1}$ 314 can similarly be sliced channel-wise into G partitions at 316, and the slices 316 can be element-wise multiplied by the output of the forget gate 312 at 318. The forget gate 312 may include one or more convolutional layers. The output of the bottleneck gate 310 can be processed by an input gate 320 and one or more convolutional layers 322. At 324, the output of the convolutional layer 322 and the input gate 320 can be multiplied, and the output 324 can be added (at 326) to the output at 318 to generate slices of the updated state $c_t$ 328, which can be concatenated channelwise to generate the updated state $c_t$ 328. The output of the bottleneck gate 310 can be input into an output gate 330, and the output of the output gate 330 can be multiplied by the slices of the state $c_t$ 328 to generate slices of the updated state $h_t$ 332, which can be concatenated channelwise to generate the updated state $h_t$ 332. The output gate 330 can include one or more convolutional layers. The output of the bottleneck gate 310 can be concatenated at 334 with the slices of the updated state $h_t$ 332 to generate the output 336.

In practice, the shared memory layer 300 (e.g., a long short-term memory network) may be unable to completely preserve its state across updates. The sigmoid activations of the input gate 320 and the forget gate 312 may rarely saturate completely, which can result in a slow state decay where long-term dependencies are gradually lost. When compounded over many steps, predictions using the $f_1$ feature extractor network may degrade unless the $f_0$ feature extractor network is rerun.

To address this, additional aspects of the present disclosure provide for skipping state updates when the $f_1$ feature extractor network analyzes a frame. Stated differently, the output state from the last time the $f_0$ feature extractor network was run can always be reused. This can greatly improve the ability of the shared memory layer 300 to propagate temporal information across long sequences, resulting in minimal loss of accuracy even when the $f_1$ feature extractor network is exclusively run for tens of steps.

Example Training Methods

Example aspects of the present disclosure further provide for training an interleaved object detection model. For example, the feature extractor networks of an interleaved object detection model can be pretrained without the detection layers, such as on a classification training dataset (e.g., Imagenet classification training dataset) in order determine an initial set of weights for the object detection model, such as the shared memory layer (e.g., LSTM layer). Further, the detection layers d can be removed and an average pooling and fully connected layer can be added immediately after the shared memory layer (e.g., LSTM layer), followed by a softmax classifier.

In some implementations, a training video can be generated. For example, each frame in a training dataset can be duplicated a plurality of times (e.g., three times) and the shared memory layer (e.g., LSTM layer) can be unrolled to a similar number of steps (e.g., three steps). At each step, a random feature extractor network can be selected to analyze a particular frame. In some implementations, the random selection can be uniformly distributed among the plurality of feature extractor networks. As an example, a 50/50 random selection between two feature networks can be used.

Further, detection training (e.g., single state detection (SSD) training) can be performed. For example, the shared memory layer (e.g., LSTM layer) can be unrolled to a plurality of steps (e.g., six steps) and a random feature extractor can be selected at each step. In some implementations, the random selection can be uniformly distributed among the plurality of feature extractor networks. The object detection models of the present disclosure can be trained on a mix of video and image data. For example, in some implementations, one or more augmentation effects can be performed between two or more successive static image frames. As an example, an image frame can be augmented by cropping a specific region at each step and panning (e.g., shifting) the crop between steps to mimic translations and zooms. This can help aid the interleaved object detection model to learn the relation between motion and box displacement. In some implementations, single state detection (SSD) training can be implemented in training an interleaved object detection model. For example, in some implementations, a batch size of 12 and a learning rate of 0.002 with cosine decay can be implemented.

A detection loss function can be used to train the interleaved object detection models of the present disclosure. For example, the detection loss function can be determined based at least in part on an output of the interleaved object detection model and a comparison to a ground-truth detection. The interleaved object detection model can then be trained based at least in part on the detection loss function.

Example Adaptive Interleaving Policies

Figure 4:
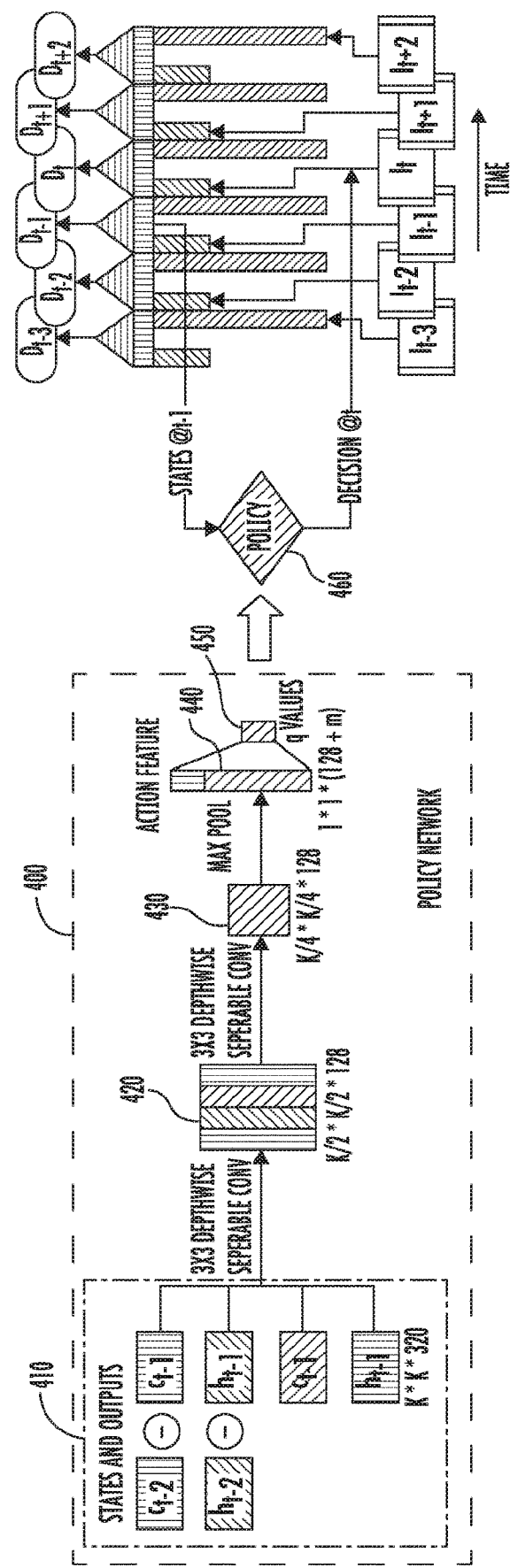
FIG. 4 depicts an example interleaved object detection model using an adaptive interleaved policy according to example aspects of the present disclosure.

In some implementations, an adaptive interleaving policy can be implemented to further improve the performance of an example interleaved object detection model of the present disclosure. For example, according to example aspects of the present disclosure, an adaptive interleaving policy can be implemented by a lightweight adaptive interleaving policy network, which can be learned using reinforcement learning. An example adaptive interleaving policy network 400 according to example aspects of the present disclosure is depicted in FIG. 4. As shown, the adaptive interleaving policy network 400 can leverage one or more states from one or more previous time steps (e.g., at time step t−1) stored in the shared memory layer to select a feature extractor network to analyze a frame at a current time step (e.g., at time step t). For example, as shown, the adaptive interleaving policy network 400 (represented as m) can examine the shared memory layer state and output 410 the next feature extractor network to run, as shown in FIG. 4. In some implementations, the adaptive interleaving policy network can be trained using Double Q-learning (DDQN).

For example, according to additional example aspects of the present disclosure, the adaptive interleaving policy network 400 can be trained using reinforcement learning by defining an action space, a state space, and a reward function. The action space can consists of m actions, where action k corresponds to running a particular feature extractor network $f_k$ at the next timestep. The state S can consist of 5 terms: the current shared memory layer state and output $c_t$ and $h_t$, as well as their changes during the current step $(c_t-c_{t-1})$ and $(h_t-h_{t-1})$. An action history term a∈$R^m$ can also be used, so that the adaptive interleaving policy network 400 can be aware of its previous actions and can avoid running a particular feature extractor network (e.g., a feature extractor network configured for accuracy, such as $f_0$) excessively.

The action history can keep a decaying count of recently taken actions. For example, at each step, equation 1 can be used:

$$a_i^t = \begin{cases} 1 + \dfrac{a_i^t}{2} & \pi(S) = i \\ \dfrac{a_i^t}{2} & \pi(S) \neq i. \end{cases} \quad (1)$$

For example, according to additional example aspects of the present disclosure, a reward function can be used to balance between running a feature extractor network configured for speed (e.g., $f_1$) as frequently as possible while maintaining accuracy. For example, the reward function can be defined as the sum of a speed reward and an accuracy reward. For the speed reward, a positive constant value β can be defined and β reward can be awarded when a feature extractor network configured for speed (e.g., $f_1$) is run. For the accuracy reward, the detection losses after running each feature extractor can be computed, and the loss difference between the minimum-loss feature extractor and the selected feature extractor can be determined. For example, the final reward can be expressed as shown in equation 2:

$$R(S, a) = \begin{cases} \min_i E(f_i) - E(f_0) & \pi(S) = 0 \\ \beta + \min_i E(f_1) - E(f_1) & \pi(S) = 1, \end{cases} \quad (2)$$

where $E(f_i)$ denotes the detection loss after using features from $f_i$.

In some implementations, the adaptive interleaving policy network 400 can be a lightweight convolutional neural network which can predict the Q-value of each state-action pair given the state. For example, in some implementations, the states and outputs 410 can be provided to one or more convolutional layers 420, 430, and 440. For example, the adaptive interleaving policy network 400 can perform a grouped convolution using each of the four convolutional states as separate groups, as shown at 420. Further, the adaptive interleaving policy network 400 can perform a depthwise separable convolution, as shown at 430, and use max pooling to remove the spatial dimensions, as shown at 440. The adaptive interleaving policy network 400 can then concatenate the action feature vector and apply a fully connected layer to obtain n outputs, the Q-values for each state-action pair, as shown at 450.

According to example aspects of the present disclosure, the adaptive interleaving policy network 400 can be trained by generating batches of inference data $(S_t, a, S_{t+1}, R_t)$ by running the interleaved object detection model in inference mode. For example, training data can be input into the interleaved object detection model. In some implementations, the entire interleaved object detection model including the adaptive interleaving policy network 400 can be trained end-to-end. In other implementations, the object detection model can be pretrained (e.g., pretrained weights can be determined for the feature extractor networks absent the adaptive interleaving policy network 400), and the adaptive interleaving policy network 400 can be trained by freezing all weights outside of the adaptive interleaving policy network 400. After generating the batches of inference data, the adaptive interleaving policy network 400 can be trained based at least in part on the batches of inference data. For example, in some implementations, the adaptive interleaving policy network 400 can be trained using standard DDQN with experience replay. An example training process is detailed in the algorithm below:

| Algorithm 1: Adaptive Interleaving Training Process |
|---|
| 1: repeat |
| 2:     sample video frames $I_1, ... I_k$ |
| 3:     $a_0 \leftarrow 0$ Action   ▶ Action |
| 4:     $t \leftarrow 0$   ▶ Timestep |
| 5:     $h \leftarrow 1$   ▶ Action history |
| 6:     while t < k do |
| 7:         for every feature extractor $f_i$ do |
| 8:             $M_t^i \leftarrow f_i(I_t)$ |
| 9:             $M_t^{i+}, s_t^i \leftarrow m(M_t^i, s_{t-1})$ |
| 10:           if $i = a_t$ then |
| 11:               $s_t \leftarrow s_t^i$ |
| 12:               $D_t^i \leftarrow d(M_t^{i+})$ |
| 13:         Construct observation $S_t$ from $s_t$ and h |
| 14:         Update h according to Equation 1 |
| 15:         With probability ε, sample a random $a_{t+1}$ from [0, m) |
| 16:         Otherwise $a_{t+1} \leftarrow \text{argmax} \pi(S_t)$ |
| 17:         Compute $R_t$ according to Equation 2 |
| 18:         Add $(S_{t-1}, a_t, S_t, R_t)$ to replay buffer |
| 19:         $t \leftarrow t + 1$ |
| 20:     Sample batch B from replay buffer |
| 21:     $\pi \leftarrow \text{DDQN}(\ )B$   ▶ Update policy using Double Q-learning |
| 22: until convergence |

Once the adaptive interleaving policy network 400 has been trained, the adaptive interleaving policy 460 can be implemented by the interleaved object detection model to select a feature extractor network to analyze a particular frame, as shown in FIG. 4.

Example Synchronous and Asynchronous Configurations

In some implementations, an interleaved object detection model according to example aspects of the present disclosure can be run in a synchronous mode or an asynchronous mode. For example, as shown in FIG. 5, a synchronous mode 500 and an asynchronous mode 550 are depicted.

Figure 5:
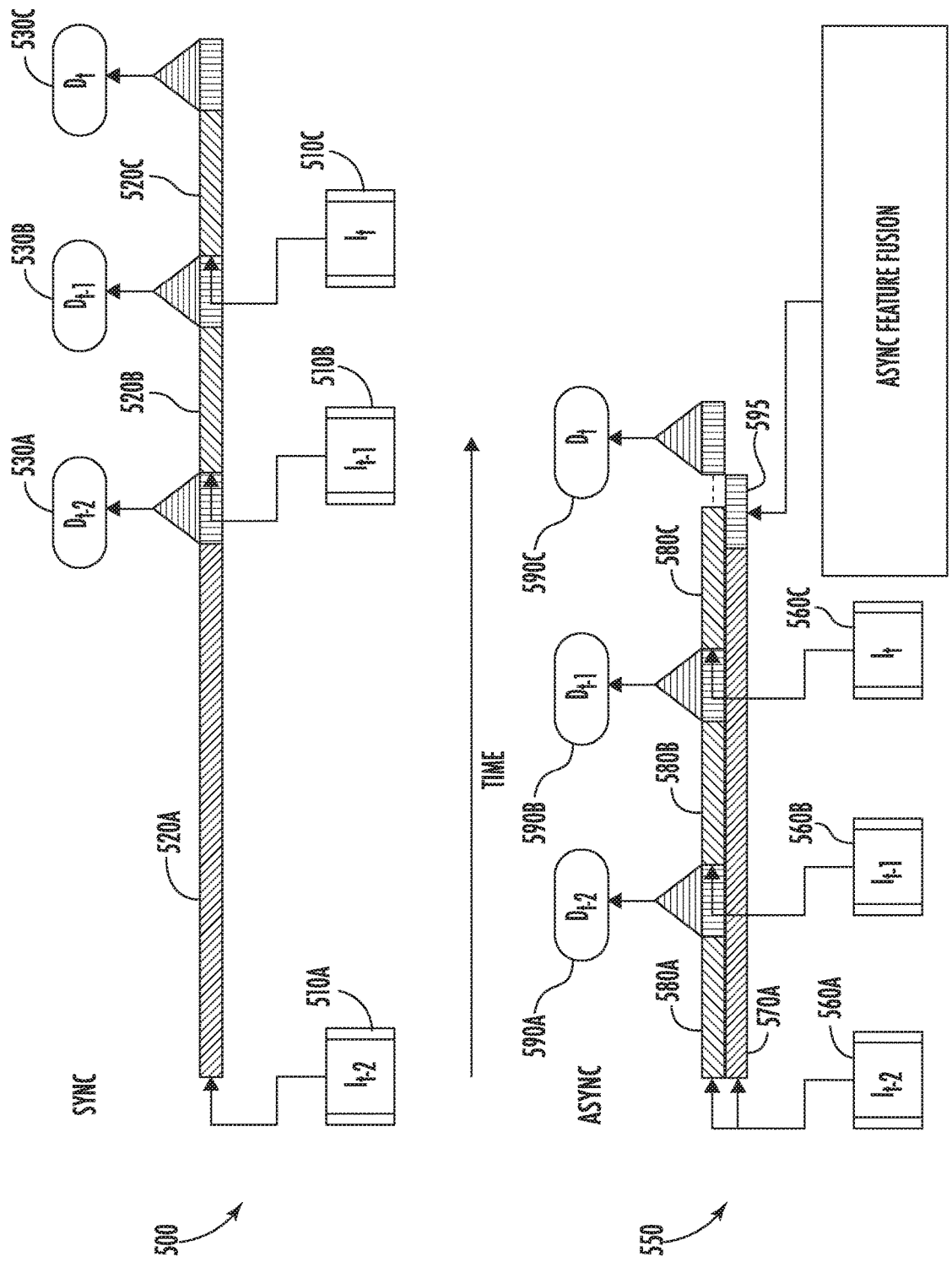
FIG. 5 depicts example synchronous and asynchronous modes for an interleaved object detection model according to example aspects of the present disclosure.

As shown in FIG. 5, in a synchronous mode, a plurality of sequential image frames 510A-C can be analyzed sequentially. For example, frame 510A can correspond to frame $I_{t-2}$, frame 510B can correspond to frame $I_{t-1}$, and frame 510C can correspond to frame $I_t$. At each time step, a single feature extractor network can be run. For example, frame 510A can be analyzed at 520A by a first feature extractor network (e.g., a feature extractor network configured for accuracy), and following analysis, a detection $D_{t-2}$ 530A can be determined. Once frame 510A has been analyzed, frame 510B can be analyzed. For example, frame 510B can be analyzed at 520B by a second feature extractor network (e.g., a feature extractor network configured for speed), which has a shorter run time than the first feature extractor network. Following analysis, a detection $D_{t-1}$ 530B can be determined. Likewise, at 520C, the second feature extractor network (e.g., the feature extractor network configured for speed) can again be run on frame 510C, and a detection $D_t$ 530C can be determined. Thus, as shown, a single feature extractor network can be run at each time step, and the analysis for each frame $I_t$ can be sequentially performed following analysis of the previous frame $I_{t-1}$.

However, when running an interleaved object detection model synchronously, one feature extractor network is run at each timestep t, so the maximum potential latency depends on the latency of the slowest feature extractor network (e.g., fa, a feature extractor network configured for accuracy).

According to additional aspects of the present disclosure, an object detection model can be configured to run in an asynchronous mode, as depicted in FIG. 5. As shown, each feature extractor network can be configured to run concurrently in parallel threads. For example, as shown, a frame $I_{t-2}$ 560A can be provided to both the first feature extractor network (e.g., a feature extractor network configured for accuracy) at 570A and the second feature extractor network (e.g., a feature extractor network configured for speed) at 580A. Following analysis by the second feature extractor network (e.g., the feature extractor network configured for speed) a detection $D_{t-2}$ 590A can be determined. Due to the difference in computational latencies, the second feature extractor may complete analysis of frame $I_{t-2}$ 560A before the first feature extractor network. Thus, upon completing analysis of frame $I_{t-2}$ 560A, the second feature extractor network (e.g., the feature extractor network configured for speed) can analyze frame $I_{t-1}$ 560B at 580B, and following analysis, detection $D_{t-1}$ 590B can be determined. Similarly, upon completing analysis of frame $I_{t-1}$ 560B, the second feature extractor network (e.g., the feature extractor network configured for speed) can analyze frame $I_t$ 560C at 580C. However, as shown, the first feature extractor network (e.g., a feature extractor network configured for accuracy) can complete analysis of frame $I_{t-2}$ 560A at approximately the same time as the second feature extractor network (e.g., the feature extractor network configured for speed) completes analysis of frame $I_t$ 560C. As shown, at 595, the shared memory layer can fuse the extracted features from the first feature extractor network's analysis of frame $I_{t-2}$ 560A with the extracted features from the second feature extractor network's analysis of frame $I_t$ 560C (e.g., the most recently stored features in the shared memory layer). A detection $D_t$ 590C can then be determined from the fused features, as shown. Stated differently, in asynchronous mode, the second feature extractor network (e.g. $f_1$, a feature extractor network configured for speed) can be run at each timestep t and exclusively used to generate detections $D_t$, while the first feature extractor network (e.g., $f_0$, a feature extractor network configured for accuracy) can be run every r frames (in a fixed interleaving policy) and update the shared memory layer upon completion of analysis of a frame. Similarly, in an adaptive interleaving policy configuration, the second feature extractor network (e.g., $f_1$, a feature extractor network configured for speed) can be run at each timestep t and exclusively used to generate detections $D_t$, while the first feature extractor network (e.g. $f_0$, a feature extractor network configured for accuracy) can be run when selected according to the adaptive interleaving policy. Thus, in an asynchronous configuration, the second feature extractor network can then use the most recently stored features in the shared memory layer at each timestep and no longer has to wait for the first feature extractor to run before analyzing one or more frames.

An advantage provided by running an interleaved object detection model in an asynchronous mode is that the maximum latency in asynchronous mode can be generally consistent across all timesteps. This can allow the interleaved object detection model to run smoothly in real-time (e.g., an online mode) on a mobile device, such as a smartphone.

Example Devices and Systems

Figure 6A:
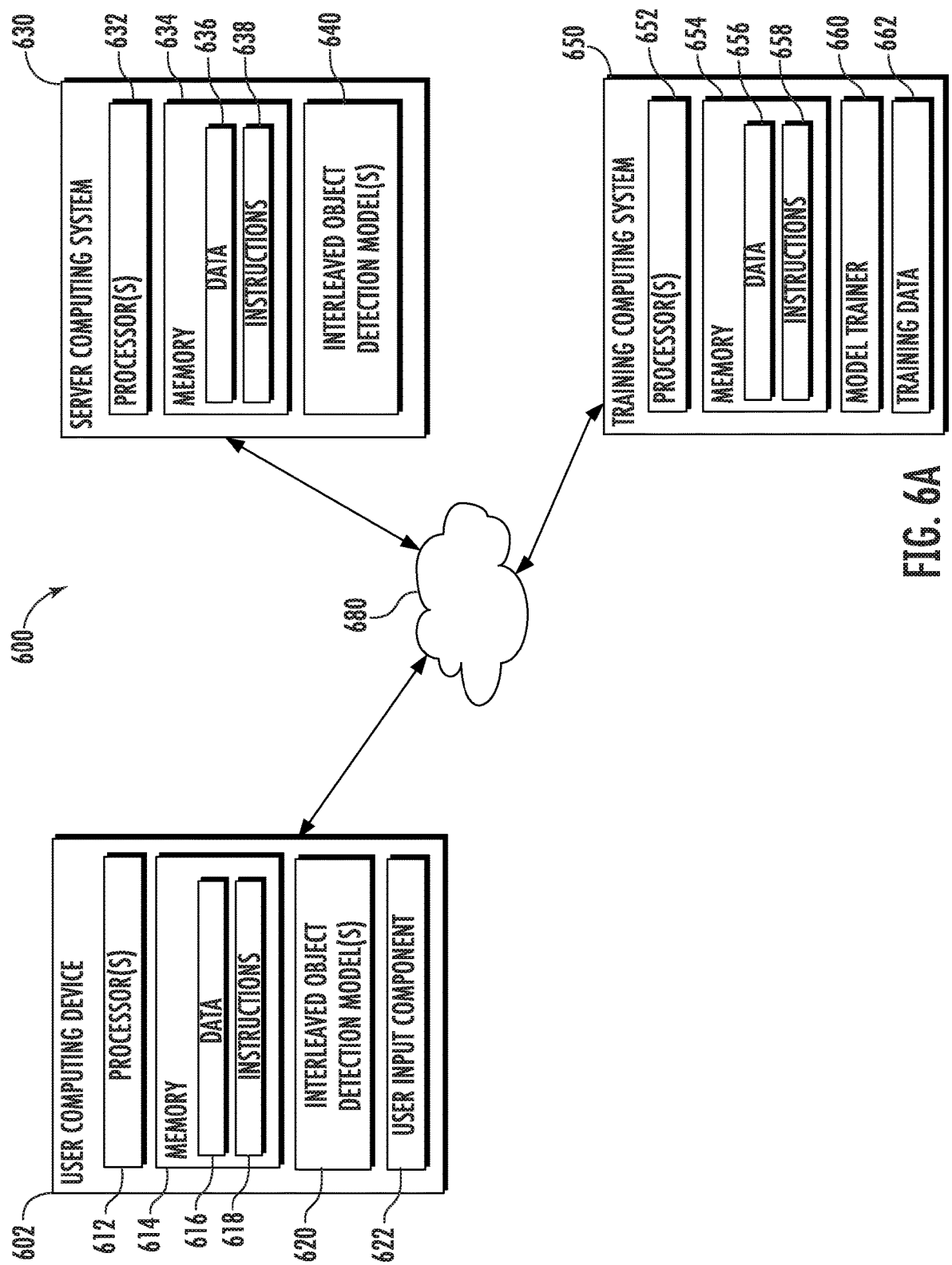
FIG. 6A depicts a block diagram of an example computing system according to example aspects of the present disclosure.
Figure 6B:
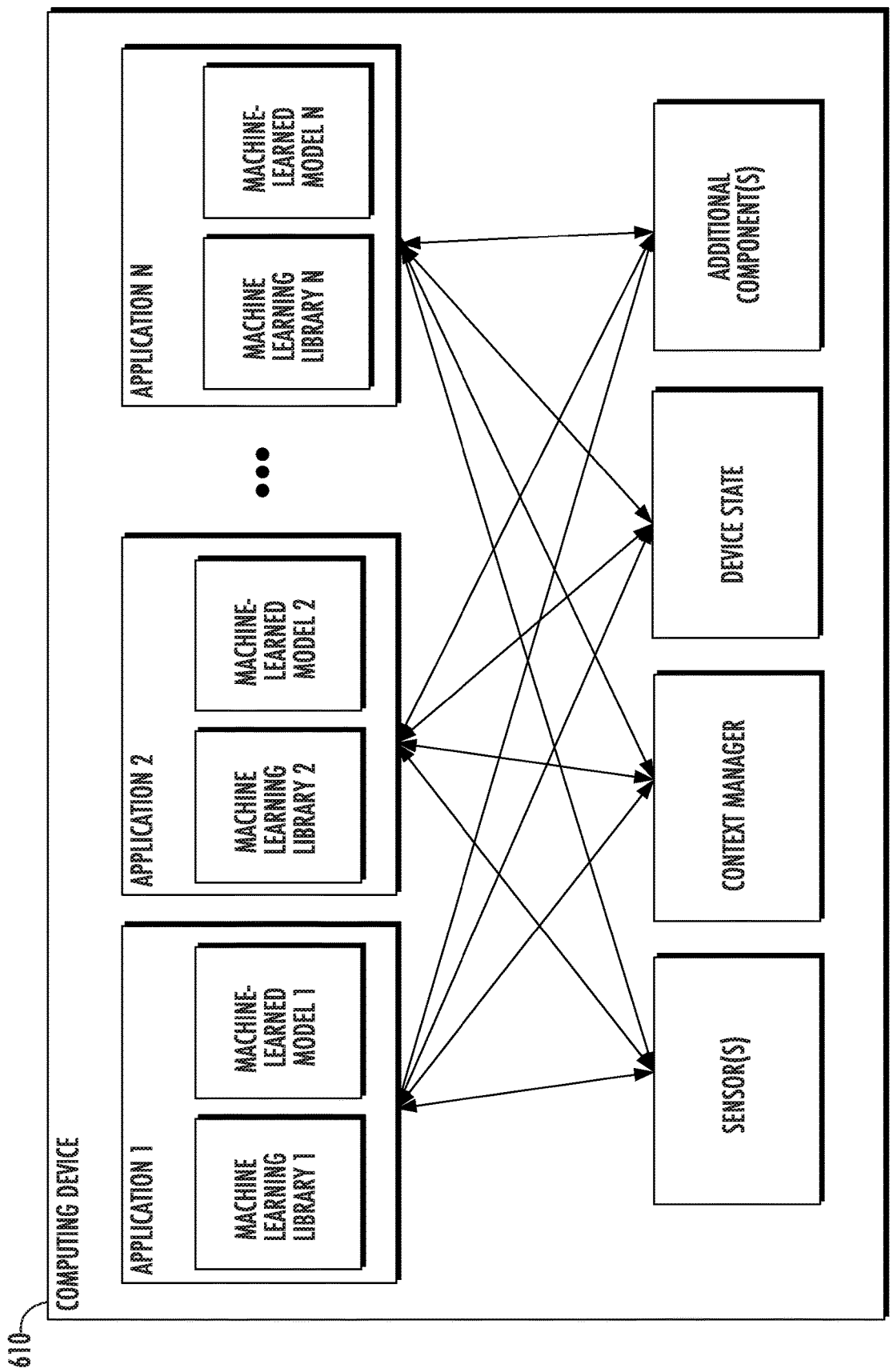
FIG. 6B depicts a block diagram of an example computing device according to example aspects of the present disclosure.
Figure 6C:
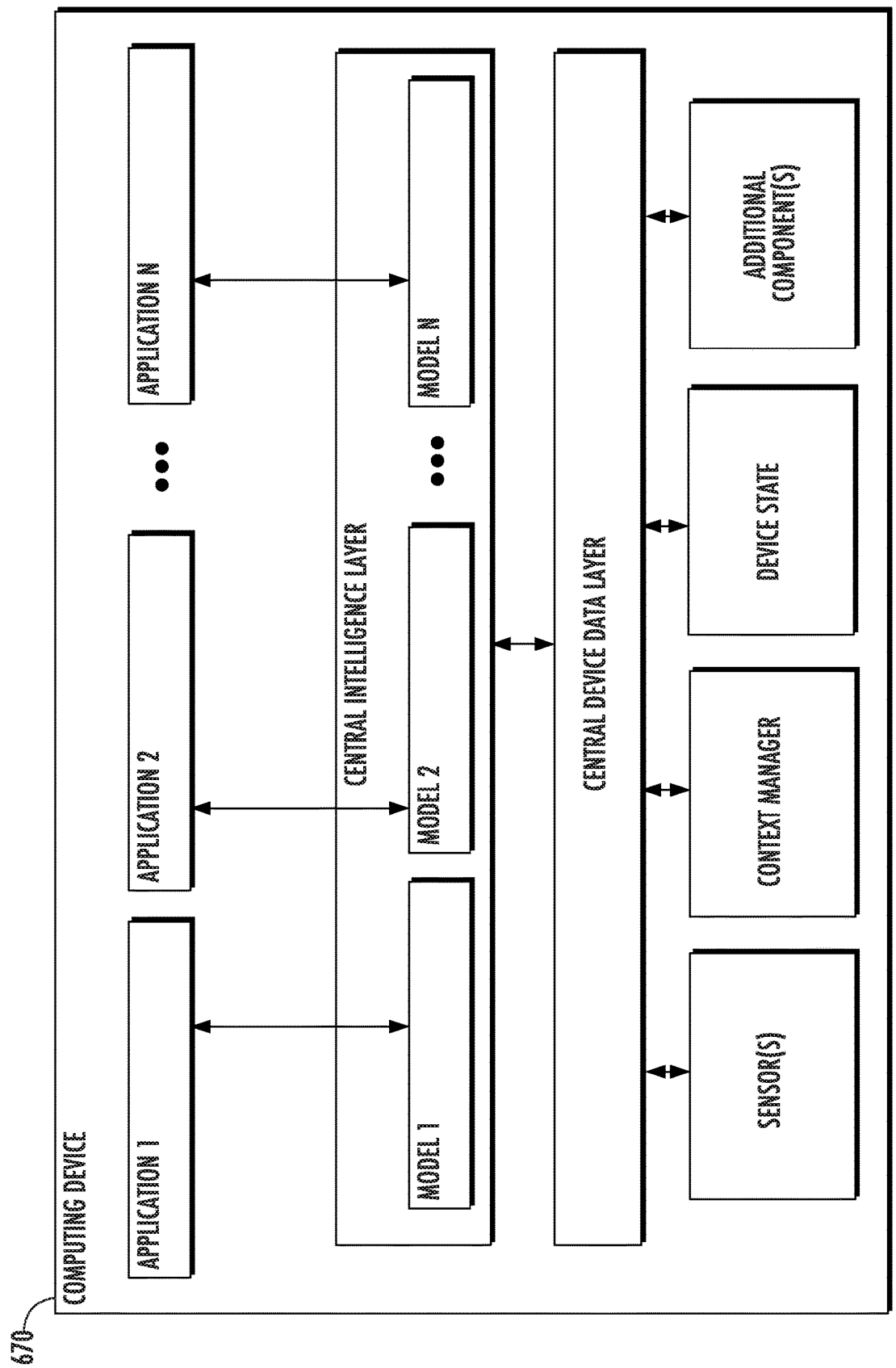
FIG. 6C depicts a block diagram of an example computing device according to example aspects of the present disclosure.

FIG. 6A depicts a block diagram of an example computing system 600 that performs interleaved video object detection according to example aspects of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, a FPGA, a controller, a microcontroller, etc.) and can be one processor or a plurality of processors that are operatively connected. The memory 614 can include one or more non-transitory computer-readable storage mediums, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more interleaved object detection models 620. For example, the interleaved object detection models 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example interleaved object detection models 620 and/or components thereof are discussed with reference to FIGS. 1-5.

In some implementations, the one or more interleaved object detection models 620 can be received from the server computing system 630 over network 680, stored in the user computing device memory 614, and then used or otherwise implemented by the one or more processors 612. In some implementations, the user computing device 602 can implement multiple parallel instances of a single interleaved object detection model 620 (e.g., to perform parallel interleaved video object detection across multiple instances of video streams).

More particularly, as described herein, the interleaved object detection models 620 can use a plurality of feature extractor networks and a shared memory layer to perform object detection in video streams. In some implementations, the interleaved object detection models 620 include an adaptive interleaving policy network configured to implement an adaptive interleaving policy. In some implementations, the interleaved object detection models 620 can implement a fixed interleaving policy. In some implementations, the interleaved object detection models 620 can operate in a synchronous and/or asynchronous mode.

Additionally or alternatively, one or more interleaved object detection models 640 can be included in or otherwise stored and implemented by the server computing system 630 that communicates with the user computing device 602 according to a client-server relationship. For example, the interleaved object detection models 640 can be implemented by the server computing system 640 as a portion of a web service (e.g., a video object detection service). Thus, one or more models 620 can be stored and implemented at the user computing device 602 and/or one or more models 640 can be stored and implemented at the server computing system 630.

The user computing device 602 can also include one or more user input component 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 630 includes one or more processors 632 and a memory 634. The one or more processors 632 can be any suitable processing device (e.g., a processor core, a microprocessor, an ASIC, a FPGA, a controller, a microcontroller, etc.) and can be one processor or a plurality of processors that are operatively connected. The memory 634 can include one or more non-transitory computer-readable storage mediums, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more machine-learned interleaved object detection models 640. For example, the models 640 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 640 and/or components thereof are discussed with reference to FIGS. 1-5.

The user computing device 602 and/or the server computing system 630 can train the models 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, a FPGA, a controller, a microcontroller, etc.) and can be one processor or a plurality of processors that are operatively connected. The memory 654 can include one or more non-transitory computer-readable storage mediums, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the user computing device 602 and/or the server computing system 630 using various training or learning techniques, such as, for example, backwards propagation of errors, reinforcement learning, or other techniques as described herein. In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the interleaved object detection models 620 and/or 640 based on a set of training data 662. The training data 662 can include, for example, image classification training datasets, video stream training datasets, ground-truth training datasets, inference data training datasets, and/or other training data as described herein.

In some implementations, if the user has provided consent, the training examples can be provided by the user computing device 602. Thus, in such implementations, the model 620 provided to the user computing device 602 can be trained by the training computing system 650 on user-specific data received from the user computing device 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM hard disk or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6A illustrates one example computing system that can be used to implement the present disclosure. Other computing systems can be used as well. For example, in some implementations, the user computing device 602 can include the model trainer 660 and the training dataset 662. In such implementations, the models 620 can be both trained and used locally at the user computing device 602. In some of such implementations, the user computing device 602 can implement the model trainer 660 to personalize the models 620 based on user-specific data.

FIG. 1B depicts a block diagram of an example computing device 610 that performs video object detection according to example aspects of the present disclosure. The computing device 610 can be a user computing device or a server computing device.

The computing device 610 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 1C depicts a block diagram of an example computing device 670 that performs video object detection according to example aspects of the present disclosure. The computing device 670 can be a user computing device or a server computing device.

The computing device 670 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 670.

The central intelligence layer can communicate with a central device data layer. The central device data layer can be a centralized repository of data for the computing device 670. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 7:
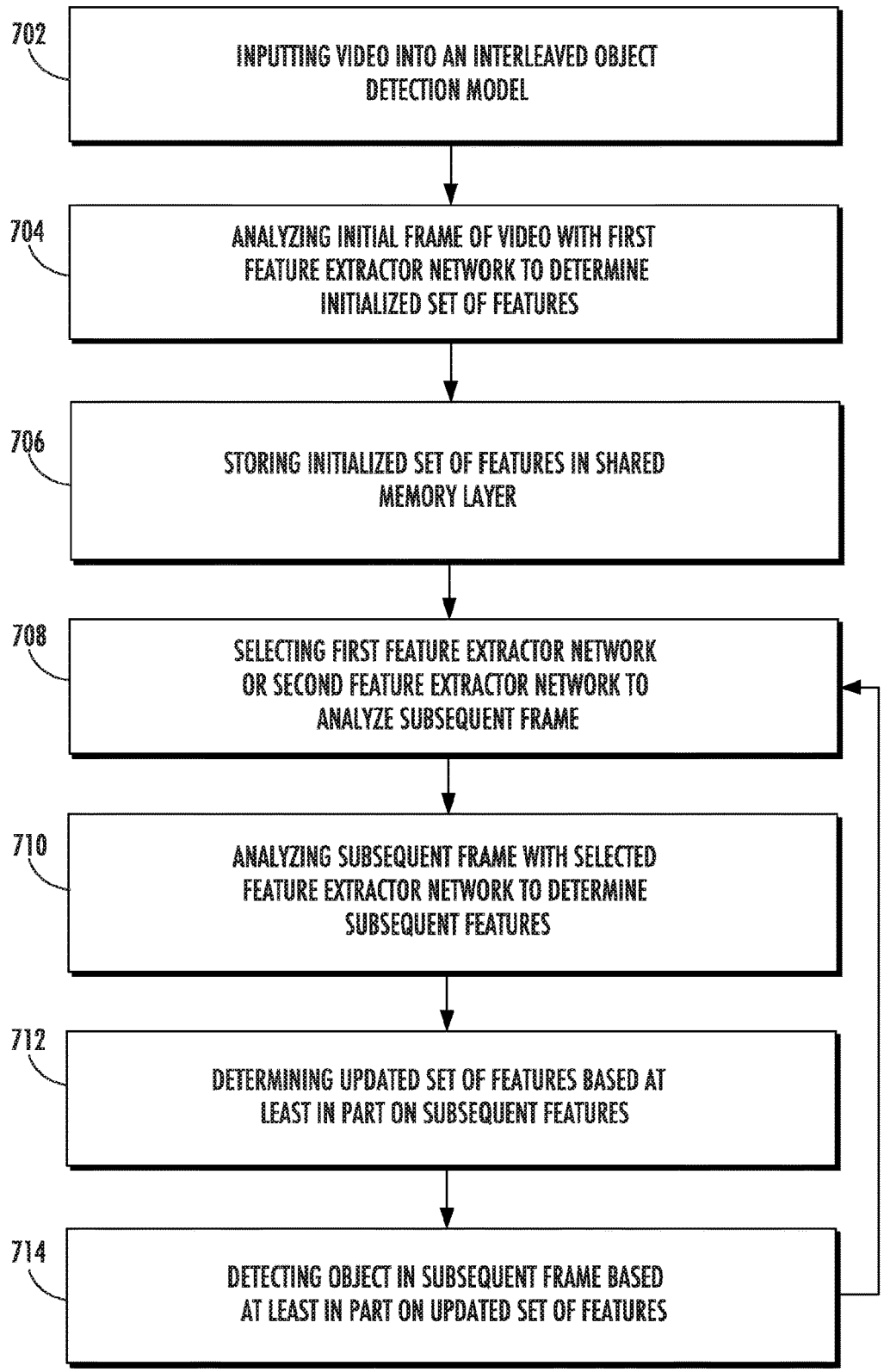
FIG. 7 depicts a flow chart diagram of an example method to detect objects in a video according to example embodiments of the present disclosure.

FIG. 7 depicts a flow chart diagram of an example method 700 to perform interleaved video object detection according to example aspects of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, the method 700 can include inputting a video into an interleaved object detection model. For example, the video can include a plurality of sequential frames. The interleaved object model can include a plurality of feature extractor networks and a shared memory layer. For example, in some implementations, the interleaved object detection model can include a first feature extractor network configured for accuracy, and a second feature extractor network configured for speed.

At 704, the method 700 can include analyzing an initial frame of the video with a first feature extractor network to determine an initialized set of features. For example, in some implementations, the first feature extractor network can be the feature extractor network configured for accuracy.

At 706, the method 700 can include storing the initialized set of features in a shared memory layer. For example, the initialized set of features can be stored in the shared memory layer to be accessed by one or more feature extractor networks, such as a feature extractor network configured for speed.

At 708, the method can include selecting the first feature extractor network or the second feature extractor network to analyze a subsequent frame. For example, in some implementations, the first feature extractor network or the second feature extractor network can be selected according to a fixed interleaving policy. In some implementations, the first feature extractor network or the second feature extractor network can be selected according to an adaptive interleaving policy. For example, in some implementations, an adaptive interleaving policy network can be included in an interleaved object detection model, and the adaptive interleaving policy network can be trained to implement the adaptive interleaving policy by, for example, using a reward function which includes a speed component and an accuracy component.

At 710, the method 700 can include analyzing the subsequent frame with the selected feature extractor network to determine one or more subsequent features. For example, the subsequent frame can be input into the selected feature extractor network, and the one or more subsequent features can be extracted by the selected feature extractor network.

At 712, the method 700 can include determining an updated set of features based at least in part on the subsequent features. For example, in some implementations, one or more previously stored features from one or more previous frames can be fused with the one or more subsequent features to determine an updated set of features. In some implementations, the updated set of features can be, for example, the one or more subsequent features. In some implementations, the updated set of features can be stored in the shared memory layer.

At 714, the method 700 can include detecting an object in the subsequent frame based at least in part on the updated set of features. For example, a detection layer can analyze the updated set of features to detect an object. In some implementations, the object detection can be, for example, SSD detection with a bounding box.

As shown, the steps 708-714 of the method 700 can be repeated for one or more subsequent frames. For example, for each frame in a video stream, a respective feature extractor network can be selected to analyze the frame. In some implementations, the interleaved object detection model can be configured to run in a synchronous mode in which the plurality of feature extractor networks are configured to run sequentially in which a single feature extractor network is run for each frame. In some implementations, the interleaved object detection model can be configured to run in an asynchronous mode in which the plurality of feature extractor networks run concurrently in parallel threads.

Figure 8:
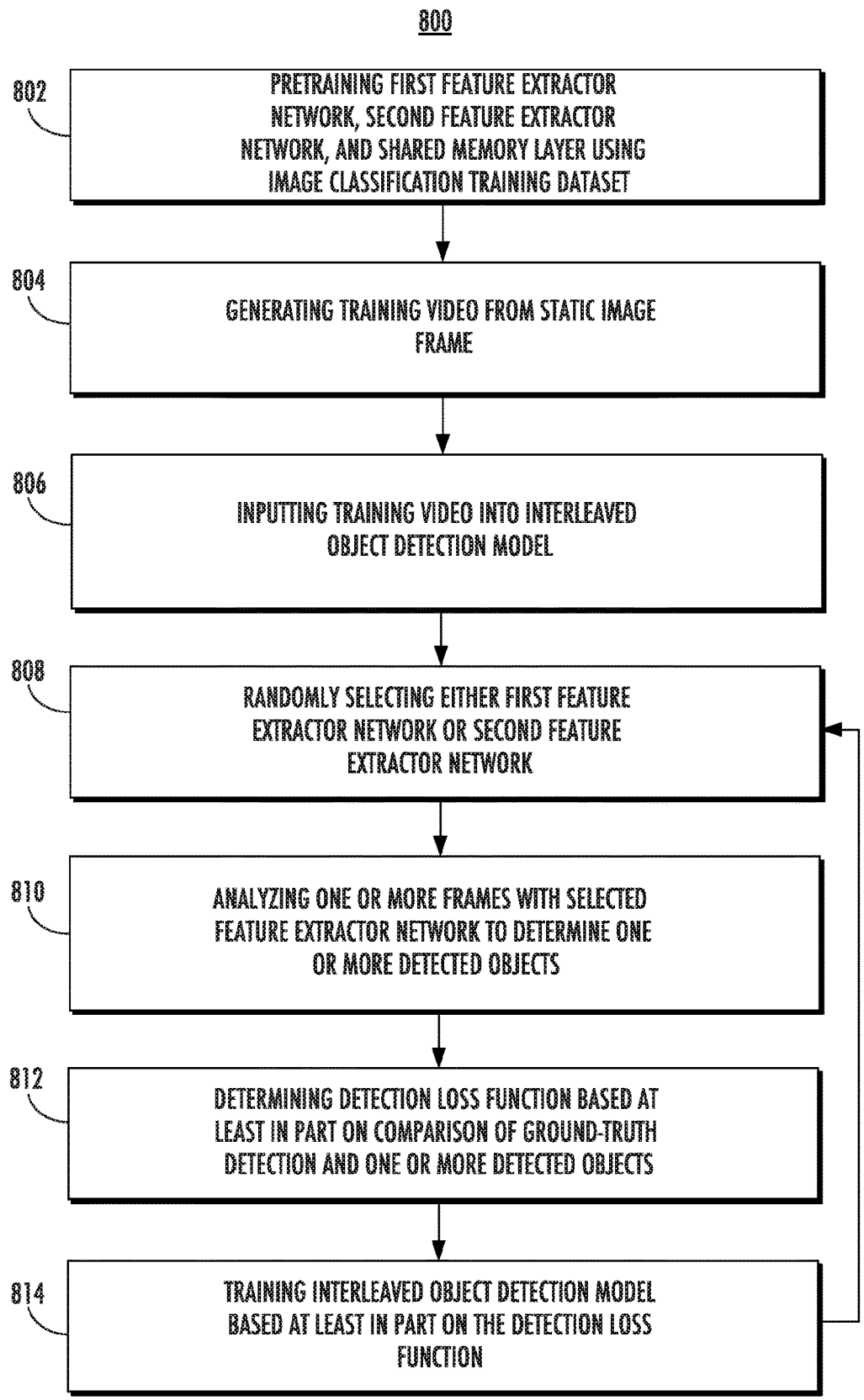
FIG. 8 depicts a flow chart diagram of an example method to train an interleaved object detection model according to example embodiments of the present disclosure.

FIG. 8 depicts a flow chart diagram of an example method 800 to train an interleaved object detection model according to example aspects of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, the method 800 can include pretraining a first feature extractor network, a second feature extractor network, and a shared memory layer of an interleaved object detection model using an image classification training dataset. In some implementations, an interleaved object detection model can include any number of feature extractor networks, and each feature extractor network can be pretrained. For example, as described herein, the feature extractor networks and/or the shared memory layer can be trained on an image classification training dataset to determine an initial set of weights for the feature extractor networks and/or the shared memory layer.

At 804, the method 800 can include generating a training video from a static image frame. For example, a plurality of successive static image frames (e.g., sequential copies of the static image frame) can be generated and arranged sequentially in a video stream. In some implementations, one or more augmentation effects can be performed between two or more of the successive static image frames. For example, the one or more image augmentation effects can include one or more crops (e.g., selecting a portion of the image), one or more zooms (e.g., zooming in or out), and/or one or more pans (e.g., shifting/sliding from a portion of the image to another portion).

At 806, the method 800 can include inputting the training video into the interleaved object detection model. For example, individual frames from the training video can be sequentially input into the interleaved object detection model.

At 808, the method 800 can include randomly selecting a feature extractor network to analyze a particular frame. For example, in some implementations, an interleaved object detection model can include a first feature tractor network and a second feature extractor network, and either the first feature extractor network or the second feature extractor network can be randomly selected, such as according to a uniform random selection (e.g., 50/50).

At 810, the method 800 can include analyzing one or more frames with the selected feature extractor network to determine one or more detected objects. For example, one or more frames from the training video can be input into the selected feature extractor network to extract one or more features from the frame. In some implementations, the one or more extracted features can be used to detect an object in the frame. For example, a detection layer can detect the one or more objects from the one or more features.

At 812, the method 800 can include determining a detection loss function based at least in part on a comparison of a ground-truth detection and the one or more detected objects. For example, the training dataset can include a ground-truth detection corresponding to a detected object in the one or more frames. The one or more detected objects from the detection layer can be compared to the ground-truth detection to determine the detection loss function.

At 814, the method 800 can include training the interleaved object detection model based at least in part on the detection loss function. For example, in some implementations, backwards propagation of errors can be used to train the object detection model.

As shown, the steps 808-814 of the method 800 can be repeated for one or more subsequent frames. For example, steps 808-814 can be repeated for each remaining frame in the training video.

Figure 9:
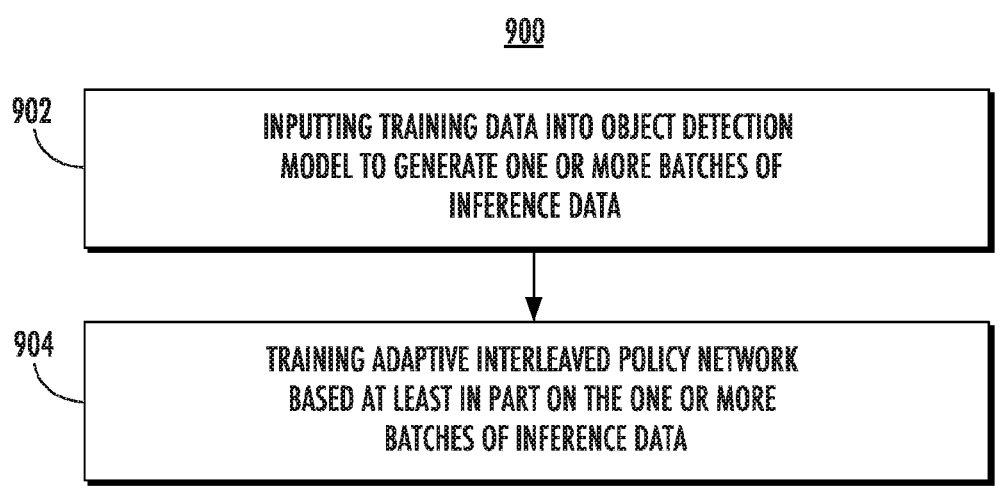
FIG. 9 depicts a flow chart diagram of an example method to train an adaptive interleaved policy network for an object detection model according to example embodiments of the present disclosure.

FIG. 9 depicts a flow chart diagram of an example method 900 to train an adaptive interleaved policy network for an object detection model according to example aspects of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, the method can include inputting training data into an object detection model to generate one or more batches of inference data. For example, the object detection model can include an adaptive interleaved policy network configured to implement an adaptive interleaved policy, a first feature extractor network configured for accuracy, a second feature extractor network configured for speed, and a shared memory layer. The training data can be input into the object detection model to generate the one or more batches of inference data.

Each batch of inference data can include state data, action data, and reward function data as described herein. For example, the reward function data can include a sum of a speed reward and accuracy reward. The speed reward can be a defined value which is awarded when the second feature extractor network configured for speed is used. The accuracy reward can be a detection loss determined based at least in part on a loss difference between a minimum loss feature extractor network and the selected feature extractor network. For example, the detection loss can be zero when the first feature extractor network configured for accuracy is selected, or the detection loss can be non-zero when the second feature extractor network configured for speed is selected. The state data can include data output by the selected feature extractor network (e.g., the first feature extractor network or the second feature extractor network) at a particular time step. The action data can include data corresponding to which feature extractor network was run (e.g., the first feature extractor network or the second feature extractor network) at a particular time step.

At 904, the method 900 can include training the adaptive interleaved policy network based at least in part on the one or more batches of inference data. For example, the adaptive interleaved policy network can be trained in order to increase (e.g., optimize) the accuracy of the interleaved object detection model while decreasing (e.g., minimizing) the latency (e.g., runtime) of the interleaved object detection model.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for detecting objects in a video, comprising:
    inputting a video into an interleaved object detection model comprising a first feature extractor network, a second feature extractor network, and a shared memory layer, the video comprising a plurality of frames;
    analyzing an initial frame of the video with the first feature extractor network to determine an initialized set of features;
    storing the initialized set of features in the shared memory layer; and
    for each of one or more subsequent frames of the video:
        selecting the first feature extractor network or the second feature extractor network to analyze the subsequent frame;
        analyzing the subsequent frame by the selected feature extractor network to determine one or more subsequent features of the subsequent frame;
        determining an updated set of features based at least in part on the one or more subsequent features; and
        detecting an object in the subsequent frame based at least in part on the updated set of features.

2. The computer-implemented method of claim 1, wherein selecting the first feature extractor network or the second feature extractor network to analyze the subsequent frame comprises selecting the first feature extractor network or the second feature extractor network according to an adaptive interleaved policy based at least in part on one or more features previously stored in the shared memory layer.

3. The computer-implemented method of claim 2, wherein the interleaved object detection model has been trained to implement the adaptive interleaved policy.

4. The computer-implemented method of claim 3, wherein the interleaved object detection model has been trained to implement the adaptive interleaved policy based at least in part on a reward function comprising a speed reward component and an accuracy component.

5. The computer-implemented method of claim 1, wherein selecting the first feature extractor network or the second feature extractor network to analyze the subsequent frame comprises selecting the first feature extractor network or the second feature extractor network according to a fixed interleaved policy.

6. The computer-implemented method of claim 1, wherein when the first feature extractor network has been selected, determining the updated set of features based at least in part on the one or more subsequent features comprises using the one or more subsequent features as the updated set of features.

7. The computer-implemented method of claim 6, further comprising:
    storing the updated set of features in the shared memory layer.

8. The computer-implemented method of claim 1, wherein when the second feature extractor network has been selected, determining the updated set of features based at least in part on the one or more subsequent features comprises fusing a set of features which has been most recently stored in the shared memory layer with the one or more subsequent features.

9. The computer-implemented method of claim 1, wherein the first feature extractor network and the second feature extractor network are configured to run sequentially in a synchronous mode in which a single feature extractor network is run for each frame.

10. The computer-implemented method of claim 1, wherein the first feature extractor network and the second feature extractor network are configured to run concurrently in an asynchronous mode in which the first feature extractor network and the second feature extractor network are run in parallel threads.

11. The computer-implemented method of claim 10, wherein the first feature extractor network is configured to periodically update the set of features stored in the shared memory layer;
    wherein the second feature extractor network is configured to analyze each frame to determine the one or more subsequent features; and
    wherein the shared memory layer is configured to determine the updated set of features by fusing the one or more subsequent features with the set of features most recently stored in the shared memory layer.

12. The computer-implemented method of claim 1, wherein the first feature extractor network comprises a feature extractor network configured for accuracy which has a reduced detection loss as compared to the second feature extractor network.

13. The computer-implemented method of claim 1, wherein the second feature extractor network comprises a feature extractor network configured for speed which has a shorter run time as compared to the first feature extractor network.

14. The computer-implemented method of claim 1, wherein the first feature extractor network and the second feature extractor network have different input resolutions.

15. The computer-implemented method of claim 1, wherein the shared memory layer comprises a long short-term memory network.

16. A computing system, comprising:
    one or more processors; and
    one or more non-transitory computer-readable media that collectively store instructions that, when executed by the one or more processors, cause the computing system to perform operations, the operations comprising:
        inputting a video into an interleaved object detection model comprising a plurality of feature extractor networks and a shared memory layer, the video comprising a plurality of frames; and
        for each of one or more frames:
            selecting one of the plurality of feature extractor networks to analyze the one or more frames;
            analyzing the one or more frames by the selected feature extractor network to determine one or more features of the one or more frames;
            determining an updated set of features based at least in part on the one or more features and one or more previously extracted features extracted from a previous frame stored in the shared memory layer; and detecting an object in the one or more frames based at least in part on the updated set of features.

17. The computing system of claim 16, wherein selecting one of the plurality of feature extractor networks to analyze the one or more frames comprises selecting one of the plurality of feature extractor networks according to an adaptive interleaved policy.

18. The computing system of claim 17, wherein the interleaved object detection model further comprises an adaptive interleaved policy network which has been trained to implement the adaptive interleaved policy.

19. The computing system of claim 16, wherein the shared memory layer is configured to:

partition the one or more previously extracted features extracted from the previous frame into a plurality of slices;

combine each of the plurality of slices with the one or more features to generate a plurality of updated slices;

process each of the plurality of updated slices separately using one or more convolutional layers of the long short-term memory network to generate a plurality of processed slices; and combine the plurality of processed slices into a processed output.

20. The computing system claim 16, wherein the one or more features and the one or more previously extracted features each comprise a respective feature map comprising a width, a height, and a plurality of channels.

21. The computing system of claim 16, wherein the computing system consists of a mobile computing device configured to run in an online mode.

* * * * *